United States Patent [19]

Hundebol

[11] Patent Number: 5,349,910
[45] Date of Patent: Sep. 27, 1994

[54] METHOD AND APPARATUS FOR INCINERATING WASTE IN A CEMENT KILN PLANT

[75] Inventor: Soren Hundebol, Valby, Denmark

[73] Assignee: F. L. Smidth & Co. A/S, Denmark

[21] Appl. No.: 101,932

[22] Filed: Aug. 4, 1993

[30] Foreign Application Priority Data

Aug. 6, 1992 [DK] Denmark .................. 989/92

[51] Int. Cl.$^5$ ............................................. F23G 5/02
[52] U.S. Cl. ................................ 110/346; 110/229;
110/246; 432/14; 432/106
[58] Field of Search .................. 110/246, 346, 229;
432/14, 103, 106

[56] References Cited

U.S. PATENT DOCUMENTS

4,295,823 10/1981 Ono et al. .
5,220,874 6/1993 Keating, III et al ............. 110/246
5,224,433 7/1993 Benoit et al. .................. 110/346

Primary Examiner—Edward G. Favors
Attorney, Agent, or Firm—Brumbaugh, Graves, Donohue & Raymond

[57] ABSTRACT

In a generally known cement kiln plant which incorporates a preheater (1), a calciner (2) having a separation cyclone (3), a rotary kiln (4) and a clinker cooler (5), a decomposition chamber (10) is additionally installed for incineration of waste. Waste is introduced into the chamber at a location (12) and decomposed in the chamber by the heat from calcined raw meal which is conveyed to the chamber from the separation cyclone (3) of the calciner via a splitting gate (13) and a pipeline (14). Gaseous products are conveyed to the calciner (2) and burned there, whereas noncombustible by-products are discharged via an outlet (15) of the chamber (10). By utilizing the heat from preheated or calcined raw meal instead of, for example, hot exhaust gases to incinerate waste, any disturbance of the draught conditions of the cement kiln plant can be avoided, and the overall control of the calcining process is improved.

8 Claims, 1 Drawing Sheet

METHOD AND APPARATUS FOR INCINERATING WASTE IN A CEMENT KILN PLANT

BACKGROUND OF THE INVENTION

The invention relates to a method for incinerating waste during the manufacture of cement clinker, in which cement raw meal is preheated in a preheater, calcined in a calciner and burned into a clinker in a kiln, for example a rotary kiln, whereafter the clinker is eventually cooled in a cooler. By this method the waste is introduced into and decomposed in a separate chamber from which gaseous products are charged to and burned in the calciner, whereas noncombustible by-products are discharged from the chamber.

A method of the aforementioned kind is known from the description of U.S. Pat. No. 4,295,823, according to which the exhaust gases from the rotary kiln are utilized for the decomposition of waste, consisting, in the present case, of used automobile tires. However, by using such a method it is difficult to make the kiln gases move up through the chamber in a controlled flow due to the high temperature. Moreover, the utilization of kiln gases for the incineration of automobile tires will have a disturbing effecting on the draught conditions of the kiln system.

SUMMARY OF THE INVENTION

It is the object of the present invention to remedy such disadvantages, and, according to the invention, this is achieved by a method whereby the decomposition of the waste in the chamber is effected by means of heat from preheated or calcined raw meal.

By utilizing the heat from preheated or partially calcined raw meal, the disturbing effect on the draught conditions of the kiln system is avoided, while, at the same time, the temperature in the decomposition chamber can be controlled in relation to the calcining temperature of the raw meal, which is generally in the range between 830° and 880° C. If the temperature should be two low, the recarbonation process will start and elevate the temperature to its previous level, and in case of any tendency towards an excessively high temperature, the degree of calcining of the raw meal will be increased.

The invention also relates to an apparatus for carrying out the aforementioned method, which apparatus comprises a preheater, a calciner with separation cyclone, a kiln, for example a rotary kiln, and a clinker cooler. The apparatus further includes a separate chamber for the decomposition of waste, which chamber is provided with an outlet for gaseous products being connected to the calciner, and a feed opening for waste and an outlet for unburned by-products.

Non-decomposable by-products can be discharged during operation and may be charged to the rotary kiln. It is possible to separate products which are not desirable to feed to the kiln, for example by magnetic separation of iron and steel parts.

According to the invention such an apparatus is characterized in that the chamber is further provided with an inlet for preheated/calcined raw meal connected via a splitting gate to the separation cyclone of the calciner or to another cyclone in the preheater.

Advantageously, the gas outlet of the decomposition chamber of the apparatus may be in direct connection with the calciner and the chamber may be provided with an air inlet and a by-product outlet at or in the bottom.

The decomposition chamber may be designed as a spouted bed chamber which is located immediately below the calciner, with its gas outlet being located at the top of the chamber, being in direct, open connection with the bottom of the calciner.

The decomposition chamber may also be designed as a fluid bed chamber or it may be a rotatable drum.

BRIEF DESCRIPTION OF THE DRAWINGS

The invention will now be described in further details by means of examples of an apparatus according to the invention and with reference to the accompanying drawings, being diagrammatical, and where.

DESCRIPTION OF THE PREFERRED EMBODIMENTS

Figure 1:
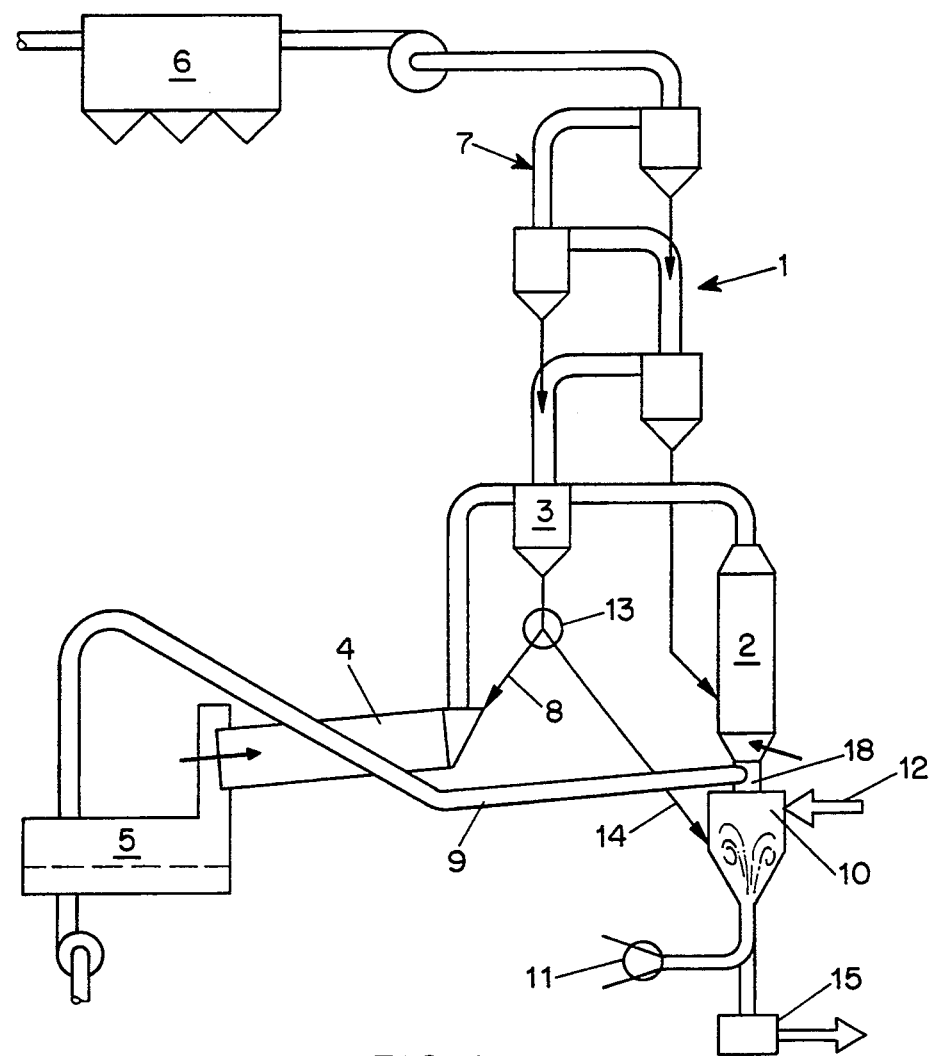
FIG. 1 shows an embodiment of an apparatus according to the invention where the decomposition chamber is a spouted bed chamber.

FIG. 1 shows a cement kiln plant of a generally known type comprising a preheater 1, calciner 2 with separation cyclone 3, a rotary kiln 4 with a clinker cooler 5 and an exhaust gas filter 6.

The actual manufacture of cement in a plant of the shown kind is effected in known manner, by cement raw meal being charged at the inlet 7 at the top of the preheater 1 and moving down through the preheater 1 in counterflow with the exhaust gases from the kiln 4 which are carried upwards through the preheater 1 and into the exhaust gas filter 6. In this way the raw meal is preheated and conveyed from the preheater down into the calciner 2 where the raw meal is calcined and conveyed in suspension to the separation cyclone 3. Here the calcined raw meal is separated from the exhaust gas and carried, via the duct 8, to the rotary kiln 4 in which the raw meal is burned into clinker in known manner. The clinker falls down into the cooler 5 where cooling of the clinker is effected by means of air. A part of the heated cooling air is directed to the calciner 2 via the duct 9 as combustion air.

Under the calciner 2 there is mounted a separate decomposition chamber 10, which at its bottom is provided with air from a blower 11. The chamber is connected at its top via an outlet 18 to the bottom of the calciner for feeding of gaseous products thereto from the decomposition in the chamber 10. Waste to be decomposed in the chamber 10 is introduced at the arrow 12. The outlet of the separation cyclone 3 for separated raw meal is provided with a splitting gate 13 which is capable of conducting a part of the preheated and calcined raw meal to the decomposition chamber 10 via a pipeline 14. By means of the air from the blower 11, a spouted bed is formed inside the chamber 10, consisting of the incoming waste from 12 and the raw meal from 14, and the waste is decomposed by means of the heat from the raw meal. The gaseous products which flow upstream to the calciner 2, while still containing combustible constituents due to the air deficiency from the blower 11, are discharged from the chamber at the top, whereas noncombustible by-products fall down from the chamber 10 to an outlet 15, being charged away or to the rotary kiln.

The air which is supplied to the chamber by means of the blower 11 may be preheated, possibly through a heat exchange with hot gases from the process.

If the waste consists of, the example, shredded automobile tires, the by-products from the decomposition chamber will comprise steel wires and potentially some raw meal, which may have been granulated in the spouted bed. After the steel wire has been removed by means of a magnetic separator, the raw meal can be recirculated to the rotary kiln. Other by-products which will not have any effect on the manufactured cement may be recycled into the process and their mineral constituents may be incorporated in the manufactured clinker so that the waste which is charged to the decomposition chamber does not, in principle, leave any by-product.

It should be noted that the raw meal which is introduced to the chamber will be discharged fully or partially from the chamber together with the exhaust gases, being directed to the calciner.

Figure 2:
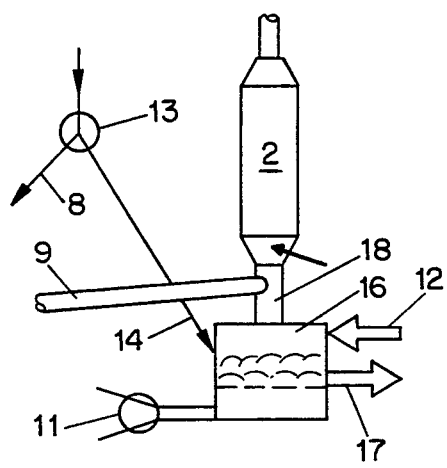
FIG. 2 shows a part of FIG. 1, but where the decomposition chamber is a fluid bed chamber.

FIG. 2 shows a part of an apparatus similar to that shown in FIG. 1, namely the calciner 2 and the splitting gate 13 with a pipeline 14 for calcined raw meal from the splitting gate 13 and to the decomposition chamber, which in this case is in the form of a fluid bed 16 with a by-product outlet 17. Also shown is the waste feed inlet 12 and the blower 11 as featured in the previous arrangement.

Figure 3:
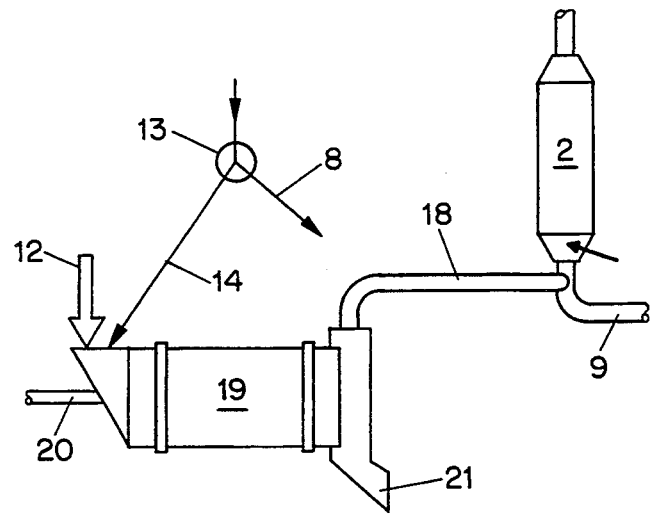
FIG. 3 shows a part of FIG. 1, but where the decomposition chamber is a rotatable drum.

FIG. 3 also shows a part of an apparatus similar to that shown in FIG. 1, but here the decomposition chamber is in the form of a rotatable drum 19 which is provided at one end with a feed inlet 12 for waste, a supply duct 14 for calcined raw meal from the splitting gate 13 and an air supply 20 from, for example, the clinker cooler 5.

At the opposite end of the drum 19 are provided the gas outlet 18 for gaseous products to the calciner and the by-product out-let 21 which may be connected directly to the inlet of the kiln so that a continuous feeding of the by-products into the clinker material is obtained.

Since the calciner in the apparatus of the aforementioned kind is provided with common installations for oil, coal or gas firing, it is possible, by regulating the feed rate of the usual fuel to the calciner, to control the exit temperature, and hence the degree of calcination. Hence it is possible to counteract fluctuations in the calorific value of the waste so that the output and quality of the clinker will not be influenced. Fluctuations in composition and calorific value may also influence the temperature in the decomposition chamber, but action can be taken to counter this phenomenon by leading a larger or smaller stream of calcined, hot raw meal via the splitting gate 13 down into the chamber. The temperature must be high enough to allow pyrolysis to take place, but, on the other hand, it must not be so high as to cause granulation of the raw meal.

With a decomposition chamber on kiln plants of known design it is uncomplicated to burn pasty waste having a reasonably constant calorific value, as for example bleaching earth and sewage sludge. This simply requires that the sticky waste be dosed in an even flow to the decomposition chamber. The oil content in bleaching earth will evaporate immediately and after a short while it will be burned in the calciner. Once the bleaching earth has been relieved of its oil content, all that remains is a dry meal which will quickly be mixed with the remaining raw meal and hence incorporated as a raw material constituent corresponding to the other raw materials.

Advantageously, sewage sludge or other wet waste may also be applied in limited amounts to the decomposition chamber where drying takes place rapidly through contact with hot meal and, subsequent to this, an immediate pyrolysis. Waste containing a high proportion of paper can be disposed of quite easily since carbonization of paper occurs already at approximately 230° C., and no residual matter is left which cannot be burned in the calciner.

I claim:

1. A method for incineration of waste during the manufacture of clinker, which clinker is manufactured by a process in which cement raw meal is preheated in a preheater, calcined in a calciner, burned into clinker in a kiln, whereafter the clinker is eventually cooled in a cooler, said method for incineration of waste comprising:

introducing the waste into a separate decomposition chamber;

decomposing the waste in the decomposition chamber by means of heat from at least one of preheated raw meal from the preheater and calcined raw meal from the calciner;

feeding gaseous products of the decomposition into the calciner; and discharging noncombustible by-products from the decomposition chamber.

2. A method according to claim 1 including the step of decomposing the waste in the decomposition chamber by means of heat from calcined raw material from the calciner.

3. An apparatus for carrying out the method according to claim 1, said apparatus comprising:

a preheater (1);

a calciner (2) with separation cyclone (3);

a kiln (4);

a clinker cooler (5);

a chamber (10, 16, 19) for decomposition of waste, said chamber (10, 16, 19) being provided with an outlet (18) for gaseous products connected to the calciner (2), a feed opening (12) for waste, an outlet (15, 17, 21) for unburned by-products, and an inlet (14) for at least one of preheated raw meal and calcined raw meal connected via a splitting gate (13) to a selected one of the separation cyclone (3) of the calciner and a cyclone of the preheater (1).

4. An apparatus according to claim 3, characterized in that the gas outlet (18) of the decomposition chamber (10, 16, 19) is in direct connection with the calciner (2) and that the chamber (10, 16, 19) is provided with an air inlet (11, 20) as well as a by-product outlet (15, 17, 21) at or in the bottom.

5. An apparatus according to claim 4, characterized in that the decomposition chamber is designed as a spout bed chamber (10) being located immediately below the calciner (2) and having its gas outlet (18) located at the top of the chamber (10) and in direct, open connection with the bottom of the calciner (2).

6. An apparatus according to claim 4, characterized in that the decomposition chamber is designed as a fluid bed chamber (6).

7. An apparatus according to claim 4, characterized in that the decomposition chamber is a rotatable drum (19).

8. An apparatus according to claim 3 wherein the inlet is connected via the splitting gate to the separation cyclone of the calciner.

* * * * *